US006591108B1

(12) United States Patent
Herrig

(10) Patent No.: US 6,591,108 B1
(45) Date of Patent: Jul. 8, 2003

(54) APPARATUS AND METHOD TO REDUCE THE REUSE FACTOR FOR ADAPTIVE-DYNAMIC CHANNEL ASSIGNMENT SYSTEMS

(75) Inventor: Hanz Werner Herrig, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/519,816

(22) Filed: Mar. 6, 2000

(51) Int. Cl.[7] .............................................. H04M 11/100
(52) U.S. Cl. ...................... 455/452; 455/513; 370/330
(58) Field of Search .................................. 455/452, 447, 455/450, 451, 453, 63, 295, 513, 509; 370/329, 330

(56) References Cited

U.S. PATENT DOCUMENTS

| 5,280,630 A | | 1/1994 | Wang ........................ 455/56.1 |
|---|---|---|---|
| 5,363,428 A | * | 11/1994 | Nagashima .................. 455/452 |
| 5,448,750 A | | 9/1995 | Eriksson et al. ........... 455/33.1 |

OTHER PUBLICATIONS

R. S. Carson, *Radio Communications Concepts: Analog*, John Wiley & Sons, 1990, pp. 97–99.
U.S. patent application Ser. No. 09/431,785, Herrig, filed Nov. 2, 1999.
U.S. patent application Ser. No. 09/431,792, Herrig, filed Nov. 2, 1999.
U.S. patent application Ser. No. 08/034,923, Borst et al., filed Mar. 5, 1998.
U.S. patent application Ser. No. 09/035,453, Borst et al., filed Mar. 5, 1998.
U.S. patent application Ser. No. 08/811,986, Anderson et al., filed Mar. 5, 1997.

* cited by examiner

*Primary Examiner*—Thanh Cong Le
*Assistant Examiner*—Nick Corsaro

(57) ABSTRACT

A cellular radio system forms a non-homogeneous channel set and utilizes a dynamic channel assignment in a cellular radio system. This combination increases the number of candidate channels with essentially the same level of interference that is experienced with respect to utilizing a homogeneous channel set with a dynamic channel set. The resulting improvement increases the call capacity of a cellular radio system without requiring additional frequency spectrum. Hence, more cellular radio subscribers can be served simultaneously.

17 Claims, 4 Drawing Sheets

| CHANNEL NUMBER | REVERSE MEASUREMENT | FORWARD MEASUREMENT | PRIORITY PARAMETER |
|---|---|---|---|
| FIRST CHANNEL | | | |
| SECOND CHANNEL | | | |
| THIRD CHANNEL | | | |
| ⋮ | ⋮ | ⋮ | ⋮ |
| N$^{TH}$ CHANNEL | | | |

| CHANNEL NUMBER | REVERSE MEASUREMENT | FORWARD MEASUREMENT | PRIORITY PARAMETER |
|---|---|---|---|
| FIRST CHANNEL | | | |
| SECOND CHANNEL | | | |
| ⋮ | ⋮ | ⋮ | ⋮ |
| M$^{TH}$ CHANNEL | | | |

APPARATUS AND METHOD TO REDUCE THE REUSE FACTOR FOR ADAPTIVE-DYNAMIC CHANNEL ASSIGNMENT SYSTEMS

CROSS-REFERENCE TO RELATED APPLICATIONS

This patent application is related to U.S. patent application Ser. No. 08/811,986, filed on Jun. 28, 1996, U.S. patent application Ser. No. 09/034,923, filed on Mar. 5, 1998, U.S. patent application Ser. No. 09/035,453, filed on Mar. 5, 1998, U.S. patent application Ser. No. 09/431,785, filed on Nov. 2, 1999, and U.S. patent application Ser. No. 09/431,792, filed on Nov. 2, 1999.

FIELD OF INVENTION

This invention relates to cellular radio systems, and, in particular, relates to reducing intermodulation products when selecting radio channels in a dynamic channel assignment system.

BACKGROUND OF THE INVENTION

Cellular radio service is expanding at an explosive rate and is almost ubiquitous now. With cellular radio service, a predetermined radio frequency spectrum is allocated to carry the communication between a user's cellular telephone and the service provider's base station (the gateway into the cellular switching network). The spectrum is divided into frequency channels, commonly referred to as "channel numbers," and are reused by base stations within a service provider's area. The greater the reuse of frequency channels, the greater the number of cellular radio subscribers that can be simultaneously served. However, one frequency channel cannot be used by two adjacent base stations because such uses cause interference. While reusing frequency channels more often increases the frequency spectrum efficiency, it also increases the resulting interference. Each factor is balanced against the other in order to achieve a division of the radio spectrum to provide service for more customers with little or no extra cost to the service provider.

Cellular and Personal Communications Services (PCS) technologies that are based upon Time Division Multiple Access (TDMA) and Frequency Division Multiple Access (FDMA) require some form of channel assignment scheme to allocate frequency spectrum among mobile subscriber units. In some prior cellular radio systems, channel assignment was predicated on a fixed channel reuse plan. Such an approach is often referred to as a "fixed channel assignment" (FCA) and is known to satisfactorily serve uniformly heavy traffic.

When the traffic pattern is non-uniform, however, a channel assignment scheme that assigns channels dynamically can potentially serve mobile subscriber units more efficiently. While being straight-forward to implement, FCA requires elaborate base station engineering and manual engineering to install a FCA-based cellular radio system. Therefore, frequency spectrum management in cellular radio systems is migrating toward dynamic channel assignment (DCA) schemes. (DCA is also known in the art as "Flexible Channel Allocation" and "Adaptive Channel Allocation".)

In order to improve the efficiency of a base station's utilization of frequency spectrum, it is advantageous to automate channel allocation (which is represented by a channel number comprising a frequency pair assigned to a transmitter and a receiver) within the base station. However, channels are reused by a plurality of base stations and a 1s mobile subscriber unit communicating with its serving base station experiences interference from other base stations that are using the same channel. In order to ameliorate the effects of such interference, an RF monitoring receiver, typically situated at the serving base station, measures the level of interference associated with the channel when the channel is idle at the serving base station, before allocating the channel. If a measured level of interference on both the reverse link (mobile subscriber unit to base station) and the forward link (base station to mobile subscriber unit) both do not exceed predetermined thresholds, the channel is assigned to a call between the serving base station and the mobile subscriber unit.

Channel interference has both a long-term (time duration) interference component and a short-term interference component. The long-term interference component has slow variations, while the short-term interference component has fast variations. Causes for the long-term interference component include terrain features and system engineering considerations such as base station layout, antenna types and antenna configurations. Causes for the short-term interference component include traffic patterns and shadow fading. Shadow fading results from large terrain obstructions and buildings blocking signal paths as the mobile subscriber unit traverses the coverage area that is "shadowed" by an obstruction or building. Because the mobile subscriber unit passes through the affected region in a short period of time, the associated effects has fast variations.

A long-term process for measuring and analyzing long-term variations of interference ameliorates the long-term interference component by ordering the allocated frequency spectrum of each antenna sector of each cell based on a moving average of interference measurements to form a long-term list of usable channels. In order to form the initial long-term channel list, the entire frequency spectrum assigned to the wireless communications system is divided into spectral partitions wherein a spectral partition is associated with each antenna sector. The spectral partition is determined by assuming a channel set in which the members (channels) are uniformly distributed. Spectral partitions are reused so that a plurality of antenna sectors are associated with the same spectral partition in accordance with the frequency reuse factor. Typically, each spectral partition is larger than is used for a fixed channel assignment scheme, so that a greater number of candidate channels can be processed for further consideration.

A short-term process for measuring and analyzing short-term variations of interference ameliorates the short-term interference component by ordering candidate channels from the long-term list according to instantaneous interference measurements to form a short-term list. The short-term process adapts to fast (short-term) variations. The serving base station assigns a channel from a subset of the short-term list. The subset contains the "best" channels having the smallest level of interference on the forward and the reverse radio channels. If all channels of the long-term list are either unused because the associated interference level exceeds a predetermined threshold or because all channels are assigned, then channel blocking occurs. Thus, increasing the size of the long-term list by effectively controlling associated interference levels increases the call capacity (and consequently the number of cellular radio subscribers) that can be supported by a cellular radio system. Any method or apparatus that increases the long-term list for dynamic channel assignment schemes is important to the economic competitiveness of the cellular radio industry.

SUMMARY OF THE INVENTION

The present invention combines the formation of a non-homogeneous channel set with a dynamic channel assignment algorithm for use by a base station in a cellular radio system. The present invention constructs a non-homogeneous, long term channel set from which channels are processed by a dynamic channel assignment algorithm to determine the current interference levels. Thus, channels having the lowest measured levels of interference are assigned to calls that are served by the cellular radio system. This synergistic combination increases the number of candidate channels with essentially the same level of interference that is experienced with respect to a homogeneous channel set in conjunction with a dynamic channel assignment. Hence, the number of subscribers that can be served by the cellular radio system is increased.

The present invention constructs a modified channel set in which constituent channels are prioritized according to a long-term process. A selected subset of the prioritized channel set is ordered according to a short-term process. Based upon the ordering, the present invention subsequently selects a channel for a call that is served by the cellular radio system.

BRIEF DESCRIPTION OF THE DRAWINGS

A more complete understanding of the invention may be obtained from the following description, taken in conjunction with the drawings, in which.

DETAILED DESCRIPTION

Figure 1:
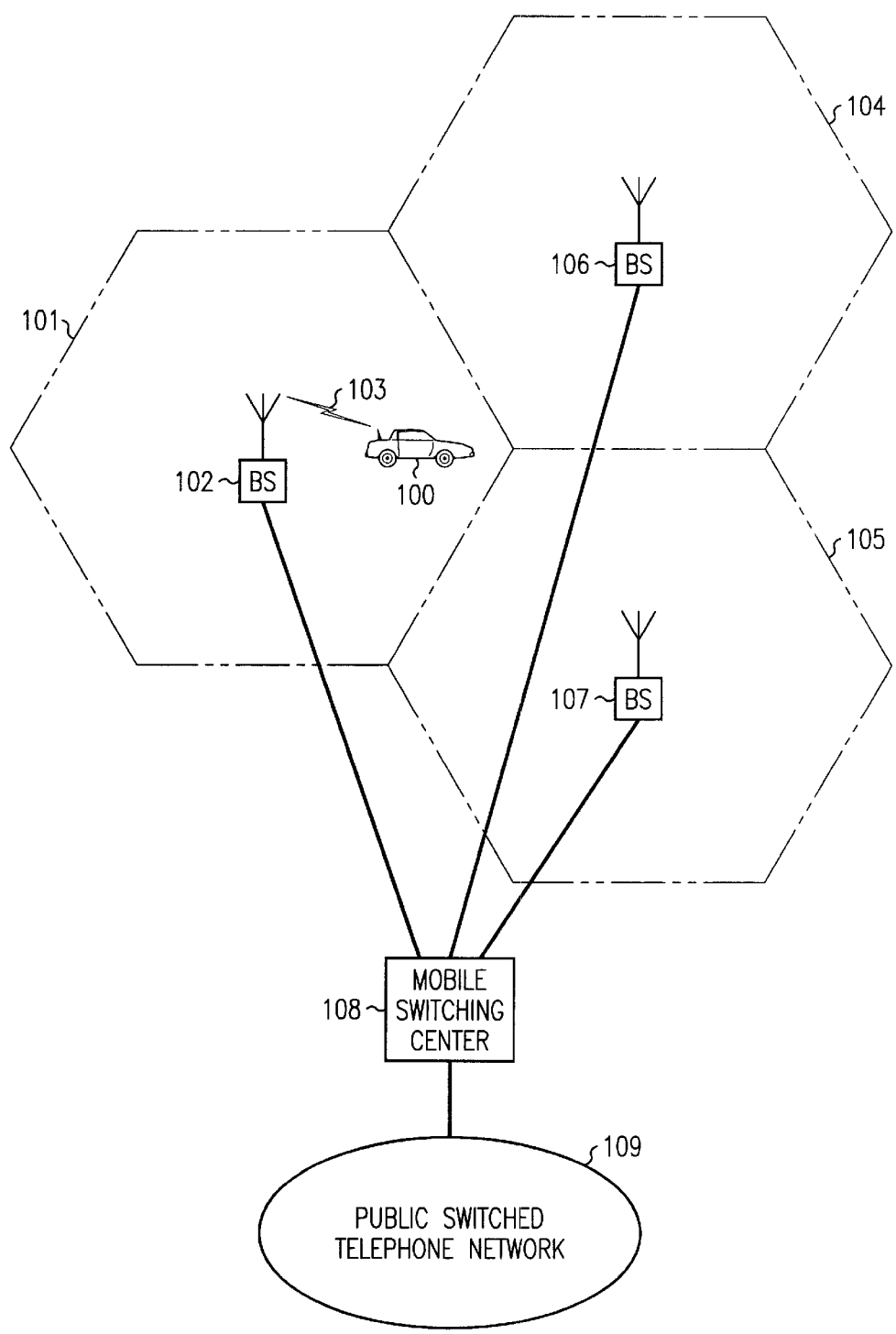
FIG. 1 illustrates a cellular radio system supporting a mobile subscriber unit during a call as supported by prior art.

FIG. 1 illustrates a cellular radio system supporting a call with mobile subscriber unit 100. Mobile subscriber unit 100 is located within cell 101 and is served by base station 102. Base station 102 is approximately located at the center of cell 101. Base station 102 communicates with mobile subscriber unit 100 over a duplex radio channel 103, associated with the base station's transmit frequency (mobile subscriber unit's receive frequency) and with the mobile subscriber unit's transmit frequency (base station's receive frequency). A "channel number" is defined as the pair of transmit frequency and receive frequency. Mobile subscriber unit 100 may move outside cell 101 to either cell 104 or cell 105. In such a case, mobile subscriber unit 100 will be served by base station 106 or base station 107, respectively. Base stations 102, 106, and 107 are controlled by mobile switching center 108. In addition, mobile switching center 108 provides a telephony connection between base stations 102, 106, and 107 in order to complete the call between mobile subscriber unit 100 and public switching telephone network (PSTN) 109.

Figure 2:
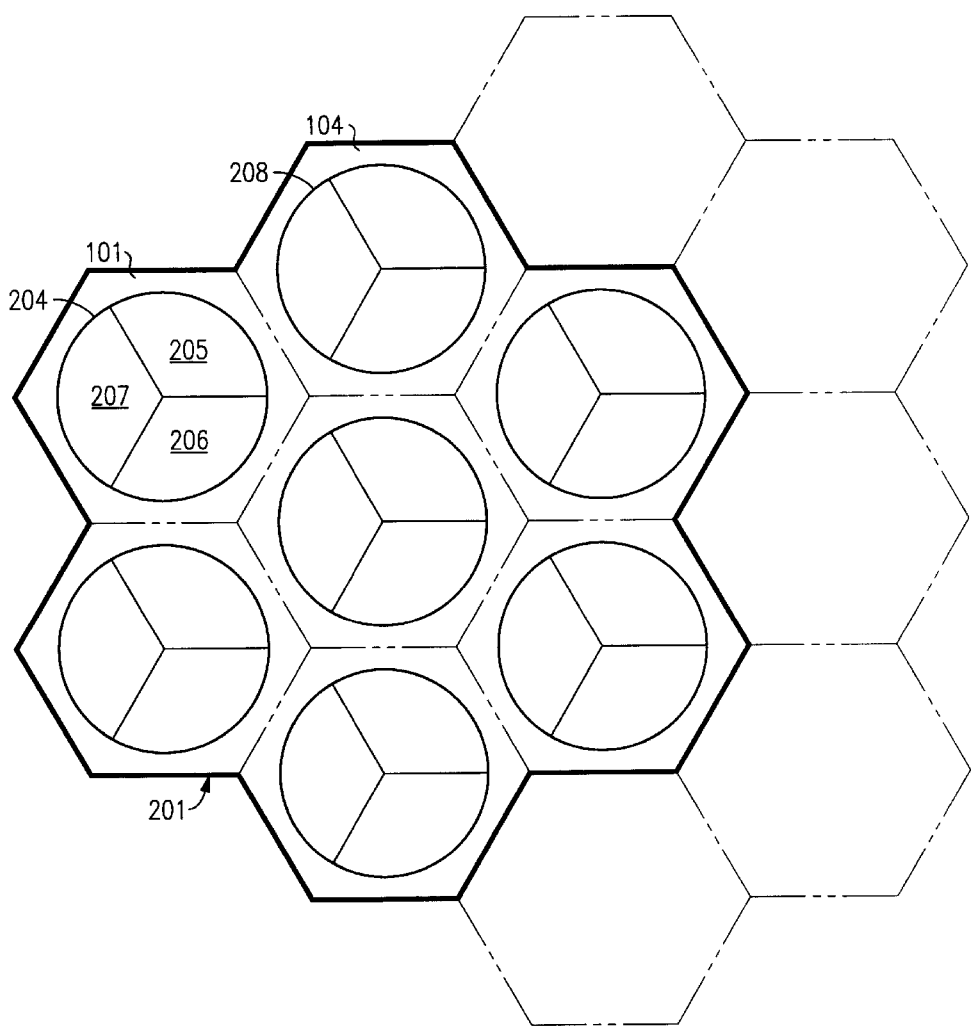
FIG. 2 illustrates a cell cluster for a cellular radio system having a three-sector antenna configuration and a frequency reuse factor of seven as supported by prior art.

FIG. 2 illustrates a cellular radio system 200 including a cell cluster 201 having a three-sector antenna configuration and a frequency reuse factor of seven. The service area of cellular radio system 200 is partitioned into cells such as cell 101 and cell 104. Cell 101 is served by base station 102, and cell 104 is served by base station 106, as described in connection with FIG. 1. Cell 101 is configured with three antenna sectors: alpha antenna sector 205, beta antenna sector 206, and gamma antenna sector 207. Each cell cluster consists of seven cells in such a configuration. Because the frequency reuse factor is seven, the frequency spectrum is reused by every cell cluster 201. Each cell requires three channel sets; therefore, a total of twenty-one channel sets are required by cell cluster 201. Other frequency reuse factors can be employed, but with fixed channel assignment (FCA), in which channels are assigned from a static list, a frequency reuse factor is typically seven for a three-sector antenna configuration. For an omnidirectional configuration (i.e., not sectors such as 205, 206 and 207), a frequency reuse factor of thirteen is typical for an FCA scheme. In such a configuration, the radio spectrum is repeated every thirteen cells. Because each cell requires one channel set, a total of thirteen channel sets are required by a cell cluster. The cell clusters, or a portion thereof, are repeatedly deployed in order to expand cellular coverage as needed.

With dynamic channel assignment (DCA), the frequency reuse factor is typically smaller than with FCA because a DCA scheme measures interference before assigning a channel to the call. The smaller the frequency reuse factor, the larger the pool of channels (as contained in the channel set) that can be considered for assigning to the call. If the frequency reuse factor is too small, the distance between base stations using the same channel is decreased, thus increasing the interference level. Moreover, the effect of intermodulation (IM) products is another source of interference if channel sets are formed without considering the potential generations of IM products. The objective of one skilled in the art is to engineer a cellular radio system with as small a frequency reuse factor that is within the acceptable level of interference imposed on the call.

Radio technology has long recognized the problem of intermodulation (IM) products in radio communications systems (including cellular radio systems). The mixing of two sinusoidal signals having different frequencies in a nonlinear system generates IM products that may interfere with other frequency channels, thus degrading signal quality. IM products correspond to the sum and difference frequency components that are attributed to the "heterodyning process." Such heterodyning is discussed in Carson, Ralph S., *Radio Communications Concepts*, John Wiley and Sons, 1990, pp. 94–99. Heterodyning does not occur in a completely linear system because no new frequency components can be created. A linear system is a system that has the property of "superposition". "Superposition" means that the output signal of the system resulting from a plurality of input signals can be determined by adding the individual output signals corresponding to each of the plurality of input signals. If the system is not completely linear, new frequency components are created whenever two or more original frequency components exist.

To illustrate the heterodyning problem, assume that the original frequency components are $f_1$ and $f_2$. Third-order nonlinear characteristics generate third-order IM products having frequency components of $2f_1-f_2$, $2f_2-f_1$, $f_1+2f_2$, $2f_1+f_2$, $3f_1$, and $3f_2$. The IM products corresponding to differences are of greater concern because these are more difficult to filter than those corresponding to sums. As an example, let $f_1$ equal 871.920 MHz and $f_2$ equal 872.550 MHz. Third-order IM products corresponding to differences are generated at 871.290 MHz ($2f_1-f_2$) and at 873.180 MHz ($2f_2-f_1$). Third-order IM products corresponding to sums are generated at 2617.020 MHz ($f_1+2f_2$), 2616.390 MHz ($2f_1+f_2$), 2615.760 MHz ($3f_1$), and 2617.650 MHz ($3f_2$). Higher-order nonlinear characteristics generate higher-order IM products such as the fifth-order and seventh-order IM products. The nth-order IM products have frequency components of $pf_1-qf_2$ and $pf_2-qf_1$, where p+q equals n and p is greater than q. Higher-order IM products have a lesser effect than the third-order IM products because the corresponding signal levels have less amplitude. Even-order IM products are generally ignored because the corresponding frequency components can be filtered. (In the above example, the second-order IM product has a frequency component of $f_1+f_2$, which equals 1744.470 MHz. This frequency is sufficiently removed from the spectrum centered around 850 MHz and thus can be easily filtered.) Third-order IM products are typically responsible for the most adverse effects on other IM products.

IM products are generated if nonlinear characteristics exist at the transmitter, receiver, or structures between the mobile subscriber unit and base station. At the base station, multiple transmitted signals, each having a corresponding frequency value, are combined by an RF combiner or power amplifier so that a common antenna can be utilized. Any nonlinear characteristics of the RF combiner, power amplifier, couplers, filters, duplexers, and cables will also cause signals corresponding to IM products to be transmitted by the antenna. These IM products are detrimental to a call if the frequency of one or more of the IM products is the same as a frequency associated with the call. Even if the RF combiner or power amplifier were completely linear, the receiver of the mobile subscriber unit is exposed to multiple signals having different frequencies. One of the signals corresponds to the frequency associated with the call while the other signals are associated with interference (i.e. calls intended for other mobile subscriber units). If the receiver of the mobile subscriber unit has nonlinear characteristics, IM products are generated. The nonlinear characteristics of the receiver are reflected in the third-order intercept point of the receiver. See Carson, Ralph S., *Radio Communications Concepts*, John Wiley and Sons, 1990, 94–99.

Channel sets that have a uniform distribution difference between adjacent channels experience IM products that fall on other channels in the channel set. Such channel sets are referred as "homogeneous" channel sets. IM products are undesirable because additional interference is generated thus limiting the minimum frequency reuse factor of the cellular radio system. U.S. patent application Ser. Nos. 09/431,785 and 09/431,792, both of which were filed on Nov. 2, 1999, disclose methods and apparatus for forming non-homogeneous channel sets thus ameliorating the generation of IM products and are incorporated by reference herein.

By forming non-homogeneous channel sets that reduce IM products, a smaller frequency reuse factor can be used for a DCA scheme because the interference levels are less than for channel sets having homogeneity. Non-homogeneous channel sets are assigned to each antenna sector of each cell. A non-homogeneous channel set forms a long-term list for the associated antenna sector of the cell. U.S. patent application Ser. No. 08/811,986, filed on Jun. 28, 1996, Ser. No. 09/034,923, filed on Mar. 5, 1998, and Ser. No. 09/035,453, filed on Mar. 5, 1998, utilize a homogeneous channel set for the long-term list and are incorporated by reference herein. However, the exemplary embodiment does not preclude other DCA schemes. Other examples of DCA schemes are disclosed in U.S. Pat. No. 5,280,630, issued to Wang and assigned to Motorola, Inc. and U.S. Pat. No. 5,448,750, issued to Eriksson, et al. and assigned to Telefonaktiebolaget L M Ericsson.

Figures 3, 4:
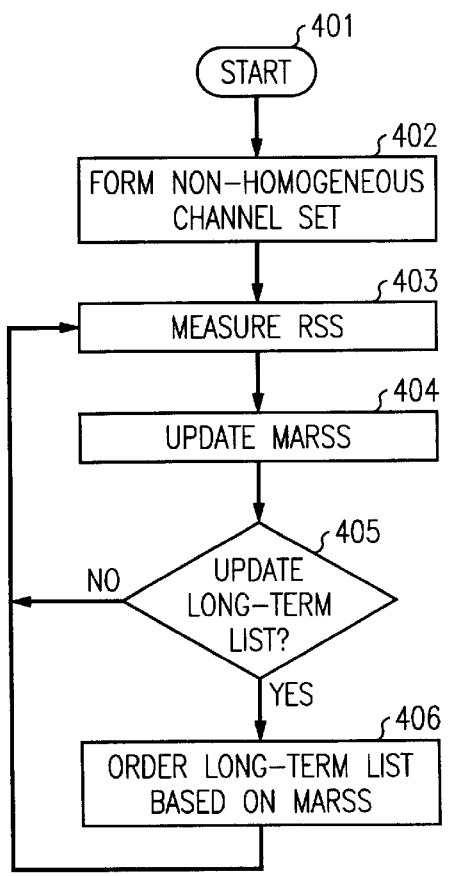
FIG. 3 illustrates the structure of the long-term list.
FIG. 4 is a flow diagram for updating the long-term list.

Turning briefly to FIG. 3, long-term list 300 contains channels from the associated homogeneous channel set that are rank-ordered according to the level of long-term interference. Long-term interference is one component of the total interference and is influenced by such factors as terrain features and system deployment (which includes base station layout, antenna types and configurations.)

Turning briefly to FIG. 4, the long-term process orders the entire assigned frequency spectrum for each antenna sector based on a moving average of interference measurements thus forming long-term list 300 for both the reverse link (uplink) channel assignments and the forward link (downlink) channel assignments. Because a moving average is used by the long-term process, it adapts to slow (long-term) variations in system characteristics.

Figures 5, 6:
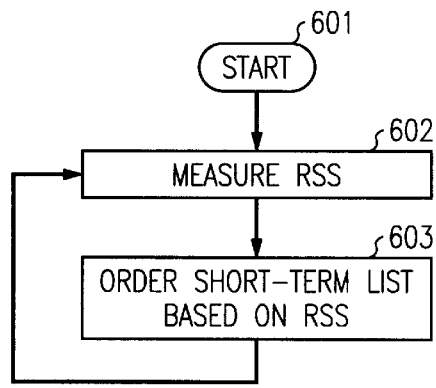
FIG. 5 illustrates the structure of the short-term list as supported by prior art.
FIG. 6 is a flow diagram for updating the short-term list as supported by prior art.

Turning briefly to FIG. 6, the short-term process uses instantaneous interference measurements to order channels 501 (as will be discussed below in connection with FIG. 5) and hence adapts to fast (short-term) variations in the cellular radio system such as traffic patterns and shadow fading (caused by structures blocking RF propagation). The long-term process and the short-term process together groom channel numbers of each sector for supporting dynamic channel assignment.

Returning to FIG. 3, which illustrates the structure of long list 300, channel 301 is a member of the non-homogeneous channel set that is assigned to the antenna sector. A monitoring receiver at base station 101 measures the long-term interference on the reverse link of channel 301 and stores the value in reverse measurement entry 302. Mobile subscriber unit 100 or a special radio unit at base station 102 measures the long-term interference on the forward link of channel 301 and stores the value in reverse measurement entry 303. Priority parameter 304 indicates the relative order of reverse measurement entry 302 and forward measurement entry 303 for channel 301. In an exemplary embodiment, the value of priority parameter 304 varies from 1 to N, where N is the number of channels in the non-homogeneous channel set. Larger values of priority parameter 304 indicate greater corresponding levels of interference as indicated in reverse measurement entry 302 and forward measurement entry 303.

FIG. 4 is a flow diagram for updating long-term list 300. Step 401 initiates the process. In step 402, channels 301 of long-term list 300 is selected from the associated non-homogeneous channel set. With step 403, received signal strength (RSS) is measured for channel 301 if the channel 301 is idle at base station 102. In step 404, moving averages of received signal strengths (MARSS) are updated for both the reverse and the forward links in reverse measurement entry 302 and forward measurement entry 303, respectively. In step 405, it is determined whether additional channels 301 must be measured. If so, steps 403 and 404 are repeated. If not, the entries in long-term list 300 are ordered according to reverse measurement entry 302 and forward measurement entry 303 by updating priority parameter 304 for each channel 301.

FIG. 5 illustrates the structure of short-term list 500. Short-term list 500 is formed by selecting M channels 301 having the lowest levels of interference as determined by reverse measurement entry 302 and forward measurement entry 303. A monitoring receiver at base station 101 measures the short-term interference on channel 501 and stores the value in reverse measurement entry 502. Mobile subscriber unit 102 or a special radio unit at base station 101 measures the short-term interference on forward link of channel 501 and stores the value in forward measurement entry 503. Priority parameter 504 indicates the relative order of reverse measurement entry 502 and forward measurement entry 503 for channel 501. In the exemplary embodiment, the value of priority parameter 504 varies from 1 to M.

FIG. 6 is a flow diagram for updating short-term list 500. Step 601 initiates the process. In step 602, received signal strength (RSS) is measured for channel 501 if channel 501 is idle (not assigned) at base station 102. Reverse measurement entry 502 and forward measurement entry 503 are updated. In step 603, entries in short-term list 500 are ordered according to reverse measurement entry 502 and forward measurement entry 503 by updating priority parameter 504 for each channel 501. The short-term process thus determines the "best" channels (i.e. the ordered short-term list 500) for assigning a channel to the call (either at call setup or handoff) being served by an antenna sector.

The smaller the number of channels contained in long-term list 300 (i.e. the larger the frequency reuse factor), the greater the probability that the assignable channels (determined as assignable by the short-term process in FIG. 6) will not be adequate for the desired call capacity. The present invention reduces the probability of this occurrence with respect to the prior art by increasing the number of channels contained in long-term list 300.

It is to be understood that the above-described embodiment is merely an illustrative principle of the invention and that many variations may be devised by those skilled in the art without departing from the scope of the invention. It is, therefore, intended that such variations be included with the scope of the claims.

What is claimed is:

1. A method for use in a base station for selecting an optimal channel to support a call between said base station and a mobile subscriber unit, said method comprising the steps of:

constructing a modified channel set from at least two purely homogeneous channel sets in which said modified channel set's measure of homogeneity is reduced with respect to said at least two purely homogeneous channel set's measure of homogeneity by selecting a plurality of channels of said modified channel set from said at least two purely homogeneous channel sets;

prioritizing the plurality of channels in said modified channel set in accordance with a first sequence of interference measurements;

ordering a selected subset of said prioritized channel set in accordance with a second sequence of interference measurements; and selecting a channel from said selected subset to support said call between said base station and said mobile subscriber unit, whereby the selected channel has a reduced measured level of interference and said cellular radio system has a greater call capacity.

2. The method of claim 1, wherein said prioritizing utilizes a function of long-term interference variations.

3. The method of claim 1, wherein said ordering utilizes a function of short-term interference variations.

4. The method of claim 2, wherein said function of long-term interference variations comprises a moving average of radio signal strength measurements.

5. The method of claim 1, further including the step of: said base station applying a reuse-distance criterion algorithm to said selected subset by utilizing channel assignment information from neighboring base stations in order to minimize interference from said neighboring base stations on said selected channel.

6. The method of claim 5, wherein the reuse-distance criterion algorithm is a cost-function-based dynamic channel assignment algorithm.

7. The method of claim 1, wherein said step of constructing said modified channel set randomly selects said plurality of channels from said at least two purely homogeneous channel sets.

8. The method of claim 1, wherein said step of constructing said modified channel set deterministically selects said plurality of channels from said at least two purely homogeneous channel sets.

9. An improvement for increasing a call capacity for a cellular radio system, said cellular radio system supporting a call between a base station and a mobile subscriber unit, said base station having a transmitter and a receiver, said cellular radio system comprising:

means for constructing a modified channel set from at least two purely homogeneous channel sets in which said modified channel set's measure of homogeneity is reduced with respect to said at least two purely homogeneous channel set's measure of homogeneity by selecting a plurality of channels of said modified channel set from said at least two purely homogeneous channel sets;

means for prioritizing said modified channel set in accordance with a first sequence of interference measurements;

means for ordering a selected subset of said prioritized channel set in accordance with a second sequence of interference measurements; and means for selecting a channel from said selected subset to said transmitter and said receiver.

10. The cellular radio system of claim 9, wherein said means for prioritizing said modified list is generated by a measurement-based dynamic channel assignment algorithm.

11. The cellular radio system of claim 9, wherein said means of prioritizing said modified channel set utilizes a function of long-term interference variations.

12. The cellular radio system of claim 9, wherein said means of ordering utilizes a function of short-term interference variations.

13. The cellular radio system of claim 11, wherein said means of long-term interference variations comprises a moving average of radio signal strength measurements.

14. The cellular radio system of claim 9, further comprising:

means for applying a reuse-distance criterion algorithm to said selected subset, wherein said base station obtains channel assignment information from neighboring base stations in order to minimize interference from said neighboring base stations on said selected channel.

15. The cellular radio system of claim 14, wherein the reuse-distance criterion algorithm is a cost-function-based dynamic channel assignment algorithm.

16. The cellular radio system of claim 9, wherein said means of constructing said modified channel set randomly selects said plurality of channels from said at least two purely homogeneous channel sets.

17. The cellular radio system of claim 9, wherein said means of constructing said modified channel set deterministically selects said plurality of channels from said at least two purely homogeneous channel sets.

* * * * *